Oct. 12, 1954  C. G. MINOR  2,691,563
REFRIGERATOR
Original Filed April 16, 1949  4 Sheets-Sheet 1
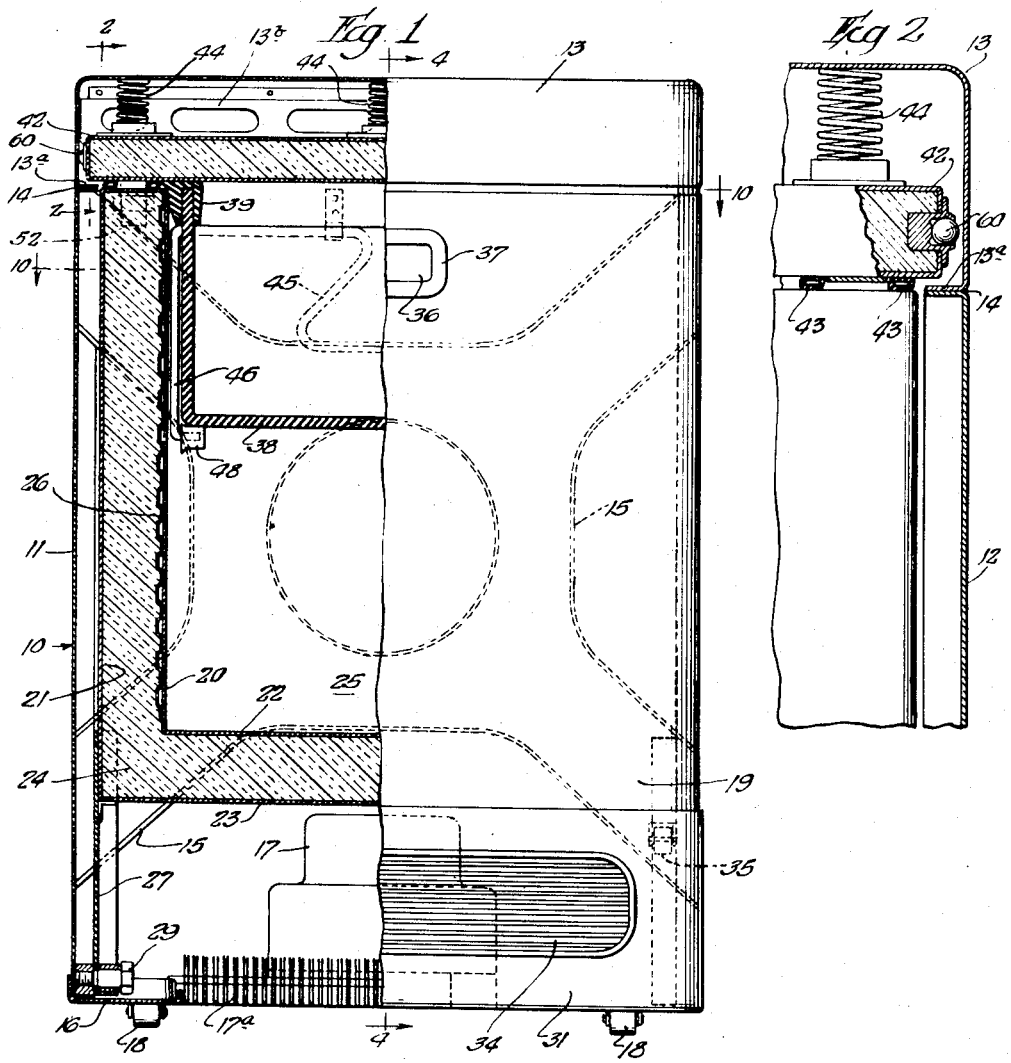
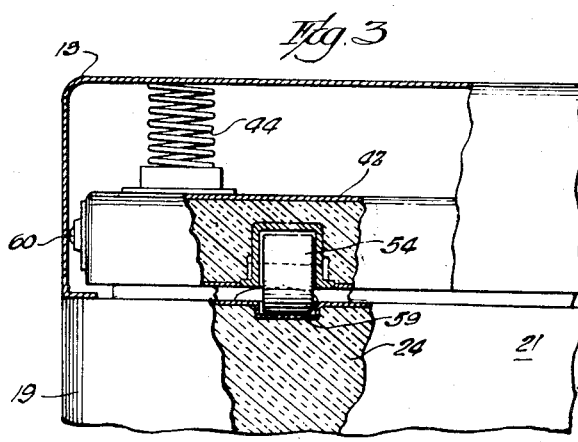
INVENTOR.
Charles G. Minor
(Deceased)
By Harry H. Gmeiner, Executor
By G. Thrall Brewer Atty.

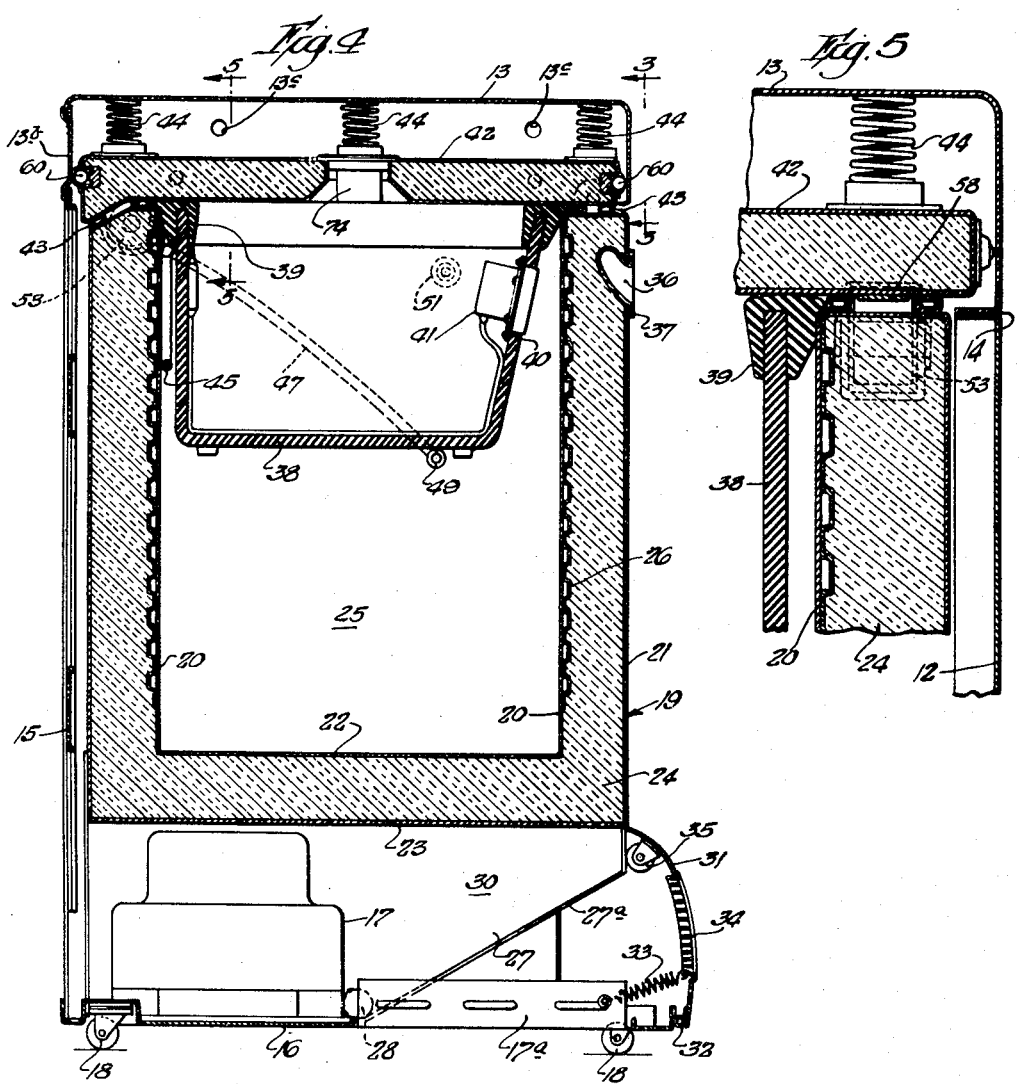

Oct. 12, 1954
C. G. MINOR
2,691,563
REFRIGERATOR
Original Filed April 16, 1949
4 Sheets-Sheet 3
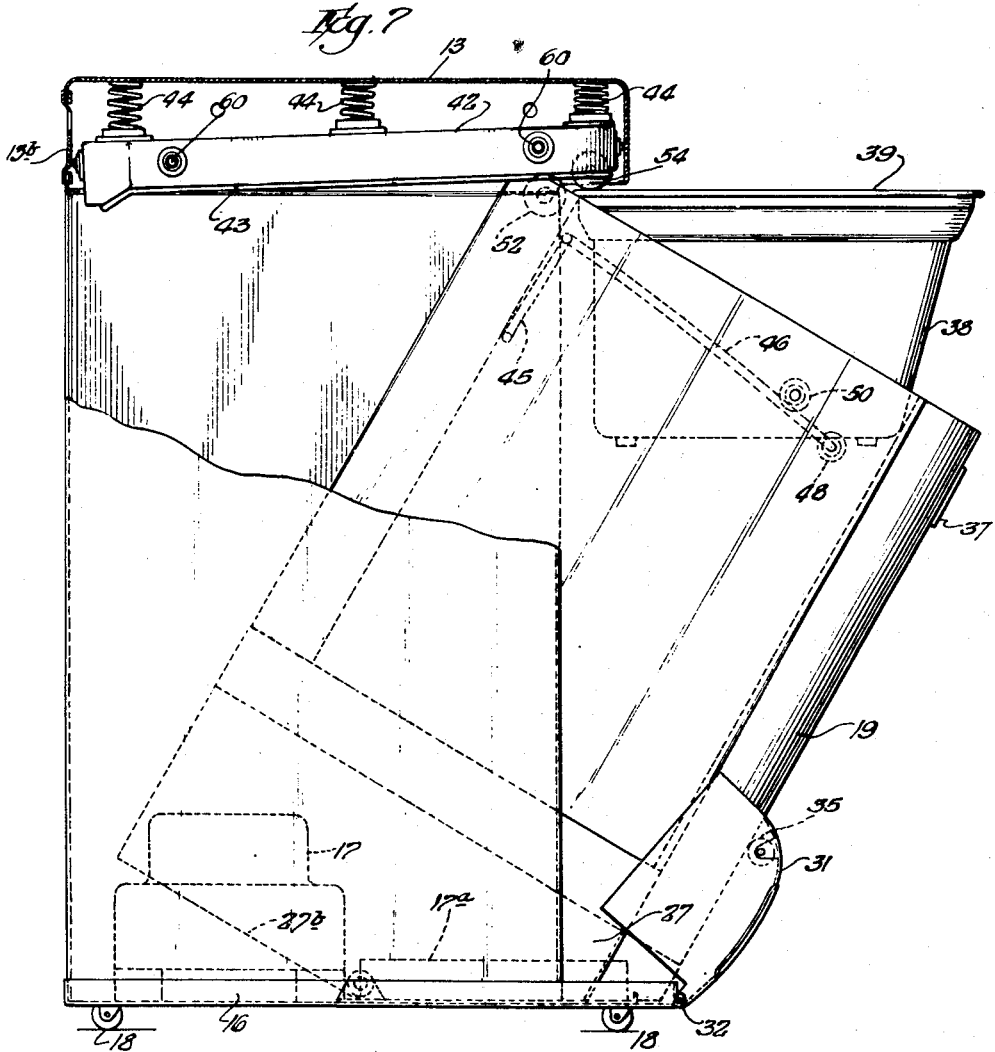
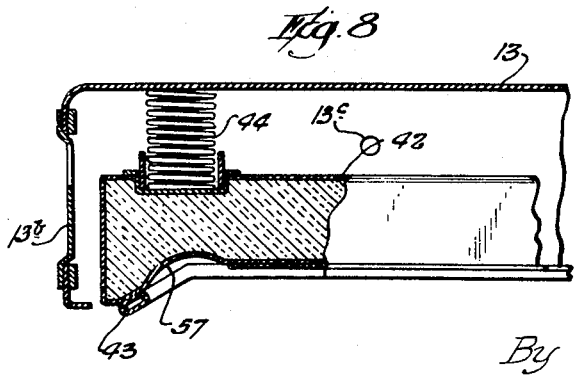
INVENTOR.
Charles G. Minor
(Deceased)
By Harry H. Gmeiner, Executor
By H. Thrall Brewer
Atty.

Oct. 12, 1954
C. G. MINOR
2,691,563
REFRIGERATOR
Original Filed April 16, 1949
4 Sheets-Sheet 4
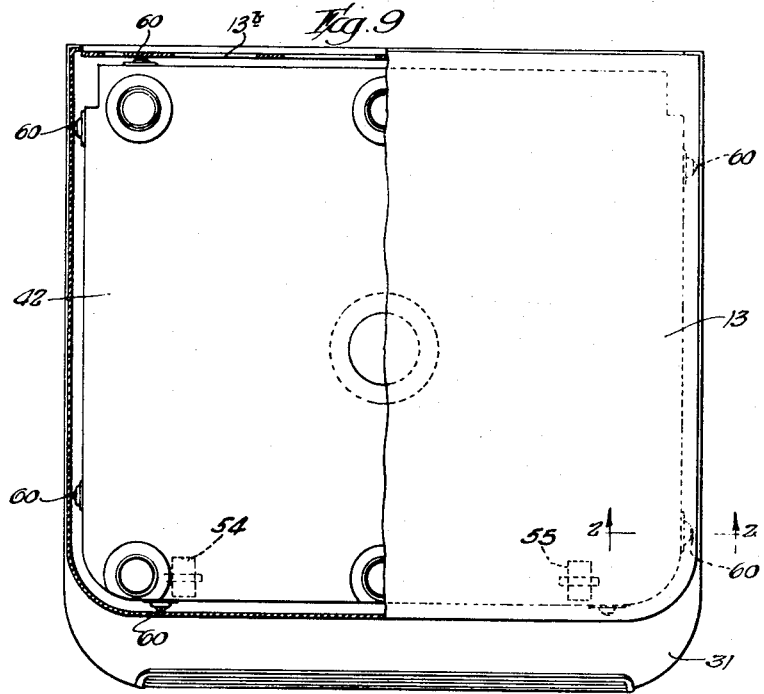
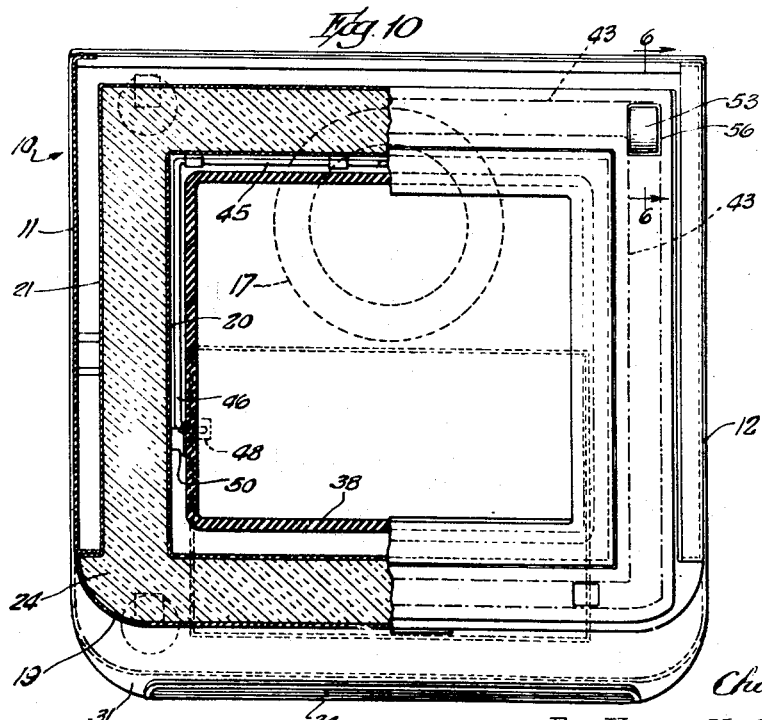
INVENTOR.
Charles G. Minor
(Deceased)
By Harry H. Gmeiner, Executor
By F. Thrall Brewer
Atty Patented Oct. 12, 1954

2,691,563

UNITED STATES PATENT OFFICE 2,691,563

REFRIGERATOR

Charles G. Minor, deceased, late of Evanston, Ill., by Harry H. Gmeiner, executor, Detroit, Mich., assignor of one-half to Ruth F. McCaleb, executrix of Albert G. McCaleb, deceased, Evanston, Ill.

Application April 16, 1949, Serial No. 87,906, now Patent No. 2,674,511, dated April 6, 1954, which is a division of application Serial No. 688,372, August 3, 1946, now Patent No. 2,490,535, dated December 6, 1949. Divided and this application May 20, 1953, Serial No. 356,212

7 Claims. (Cl. 312—269)

This invention relates to mechanical refrigerators and has to do more especially with a tiltable cabinet construction.

This application is a division of pending application Serial Number 87,906 filed April 16, 1949, now Patent No. 2,674,511, issued April 6, 1954 for Refrigerator Having a Tiltable Compartment which in turn is a division of application Serial Number 688,372 filed August 3, 1946, which was issued on December 6, 1949, as Patent No. 2,490,535. The subject matter of this application is in some respects closely related to that of my copending application Serial No. 649,240, filed February 21, 1946, now Patent No. 2,537,363, issued January 9, 1951, and reference may be had to said application for a more detailed description than is herein set forth of such features as are common to the two cases.

One of the objects of the present invention is to provide a refrigerator of simple and compact construction embodying both a freezing compartment for the freezing of foods and the like and the storage of frozen foods and a higher temperature compartment suitable for ordinary refrigeration purposes and which is particularly well adapted for use where space is at a premium as is often the case in small homes and apartments.

A further object is to provide a refrigerator of the above indicated character which can be manufactured to sell at a relatively low price without sacrifice of quality.

A feature of the invention resides in the combination of a container within a container and a cover for both containers. The main container provides a low temperature storage compartment and into the top of this is nested a second food container in which a higher refrigerating temperature is maintained. The second container is in heat-transferring relationship to the low temperature compartment and is readily removable therefrom so as to provide access to the low temperature compartment. The cover is normally thermally sealed relative to both containers, and is provided with means for preventing damage to the seal when the cover is removed from the containers.

The invention has for another object a combination of a container within a container, the inner container being movable relative to the outer container, and a cover for the inner container, with means for effecting a thermal seal between the cover and inner container, and additional means for separating the cover from the inner container and the seal while the inner container moves relative to the outer container and the cover.

The foregoing and other objects and advantages of the invention will be apparent from the following description and the accompanying drawings in which similar characters of reference indicate similar parts throughout the several views.

Referring to the drawings, of which there are four sheets:

Fig. 1 is a frontal view, half in elevation and half in vertical section, of a mechanical refrigerator embodying a preferred form of my invention;

Fig. 2 is a corner detail, in section, taken along a line 2—2 of Fig. 2 and showing, on an enlarged scale, the interior construction at the upper right hand corner of Fig. 1;

Fig. 3 is a detail view, somewhat enlarged, taken substantially at a line 3—3 of Fig. 4, except portions which are shown in section, which latter are taken to the left of line 3—3, as will be self-evident;

Fig. 4 is a vertical sectional view taken substantially at a line 4—4 of Fig. 1;

Fig. 5 is a sectional view taken substantially at a line 5—5 of Fig. 4;

Fig. 6 is a sectional detail taken substantially at a line 6—6 of Fig. 10;

Fig. 7 is a side elevational view, partly in section showing the food storage unit in its out or open position;

Fig. 8 is a fragmentary sectional view, drawn to an enlarged scale, taken at the upper left hand corner of Fig. 7;

Fig. 9 is a top view, partially in plan and partially in section, with the section taken immediately below the top of the outer housing; and Fig. 10 is a top sectional view taken approximately at a line 10—10 of Fig. 1.

The structure of the refrigerator depicted for exemplary purposes in Figs. 1 to 10 comprises a formed sheet metal housing or cabinet 10, including side walls 11 and 12 and a top 13 which may be either removable from the side walls or fixedly connected thereto. The top and side walls are joined at 14. The back of the housing consists preferably of a formed sheet metal X-brace 15 which may be either integral with or otherwise secured to the side walls, as by welding. The housing is generally rectangular in shape and open at the front except along the top border margin which is constituted by the front face of the top 13. The side walls are interconnected at the bottom by a floor plate 16 on which is mounted a compressor unit 17 and a condenser unit 17a. The whole structure is preferably mounted on casters 18 which are suitably attached to the housing.

Mounted within the housing is a generally rectangular food storage refrigeration unit 19 made of sheet metal inner and outer wall plates 20 and 21 and inner and outer bottom plates 22 and 23. The space between the inner and outer plates is filled with a suitable thermal insulating material 24. The inner wall plates and inner bottom plate define a rectangular chamber 25 which constitutes a low temperature compartment which is open at the top for access, and the low temperature therein is maintained by a surrounding evaporator coil 26 extending the full height of the rectangular chamber and which is connected to the condenser and compressor by flexible connections to provide the usual circulation of refrigerant.

Extending downwardly from the main body of unit 19 and forming integral parts of the unit are a pair of plates 27. These are connected to either side of the main body and pivotally connected at 28 to a pair of shouldered cap screws 29. Plates 27 are cut obliquely along line 27a to permit unit 19 to be tilted forwardly as depicted in Fig. 7. The rear lower edges 27b of plates 27 extend horizontally when the unit is upright, as illustrated in Fig. 4, and they serve to limit the backward or inward movement of the unit. The space 30 underneath unit 19 is closed at the front by a closure plate 31 which is hinged at 32 and held at its upper edge closely adjacent the front face of the unit by a spring 33, which permits the closure plate to rotate on its hinge when the unit is tilted. Plate 31 is provided with louver openings 34 to admit air to space 30, although such louvers may be unnecessary if the bottom of the housing is left open sufficiently to permit a free circulation of air over the radiating surface of the condenser. Rollers 35 carried by closure plate 31 bear against the front of the unit and serve to hold the upper edge of the closure in spaced relation to the unit so that it will not scrape thereon when the unit is tilted.

A recess 36 is formed in the upper front face of unit 19 to provide a manual grip for tilting the unit outwardly, and this is finished off with an escutcheon plate 37.

In the previously mentioned copending application, there has been illustrated and described suitable spring means for aiding in the return of the unit to its upright position, and dashpot means effective to cushion the return movements of the unit. Those adjuncts are applicable to the structure now being described, but they have been omitted here in order to simplify the disclosure. Reference may be had to said copending application for details concerning said spring and dashpot means; but it is to be observed that those features are not essential to the operation of the present structure and are in no way directly related to the subject matter herein claimed; although it is desirable that similar provisions be added.

Suspended from the top inner edge of unit 19 and nested in the upper portion of the low temperature compartment 25 is a basket-like container 38 made preferably of a material having good thermal insulation properties as, for example, a phenol fiber plastic or hard rubber. The interior of this container is intended to be maintained at a temperature well above 32° F. and is designed to receive food-stuffs which are to be preserved but not frozen. A gasket 39 of special design and made of a resilient material such as soft rubber or a synthetic rubber-like material is firmly attached all around to the upper edge of container 38 and has an outwardly extending flange by means of which said container is suspended on the upper inside edge of unit 19.

The temperature within container 38 is maintained in part by conduction through its walls, but its thermal insulating properties should be such that not enough heat transfer will be effected by wall conduction to cause the temperature inside said container to go as low as the temperature in the low temperature compartment. Otherwise the temperature within container 38 would tend toward such a low level that it would be necessary frequently to admit outside air in order to maintain the desired above-freezing temperature. For the purpose of effecting a positive control of the temperature inside container 38, there has been provided an opening 40 through one wall thereof and a thermostatic valve 41 for controlling the passage of air through said opening. When said valve is open an interchange of air takes place between the low temperature compartment and the interior of container 38, which serves to lower the temperature within the latter. Valve 41 is shown in detail in said copending application Serial Number 87,906 and since it is not a part of the invention claimed herein, it will not be described in detail here.

The open upper end of unit 19 is thermally sealed when in closed position by a cover 42 which preferably comprises a sheet metal shell filled with thermal insulating material. A pair of continuous gaskets 43, 43 are attached to the under side of cover 42 and/or interposed between said cover and the top face of unit 19, and downward pressure is brought to bear upon said cover and against said gaskets by means of several coil springs 44, the upper ends of which bear against the under surface of top 13. The gaskets 43, 43 serve as a secondary seal when the container 38 is used, since the cover also seals against the gasket 39 thereon. Springs 44 serve to maintain a tight joint between the cover and the top of unit 19 and between the cover and gasket 39 while at the same time enabling the cover to rise to a limited extent in order to clear the unit when it is tilted from closed to open position and upon restoration to closed position.

A spring member 45 attached to the rear inner wall of unit 19 has a pair of forwardly and downwardly extending resilient arms 46, 47 located at either side of container 38 and each provided at its free end with a roller 48, 49 which underlies the under surface of container 38 and presses upwardly thereon. The stiffness of resilient arms 46, 47 is such that the forward portion of container 38 is lifted as unit 19 is tilted forwardly. This is clearly illustrated in Fig. 7, from which it will be seen that container 38 maintains nearly the same level irrespective of the positions of unit 19. This is necessary in order to prevent spilling of fluids in the container; but it is not necessary to observe any such precaution with respect to the contents of the low temperature compartment because materials are preserved in their solid state in that part of the refrigerator.

The upward movement of resilient arms 46 and 47 is limited by a pair of stops 50, 51 which are secured to side walls of compartment 25.

When, from time to time, which is infrequent in normal use, it is necessary to obtain access to the low temperature compartment, container 38 is lifted out and may be placed on the flat upper surface of top 13 or in any other convenient place.

For the purpose of lifting cover 42 sufficiently to clear the top of unit 19 when the latter is being tilted from the closed to the open position, and again during restoration to the closed position, there are provided two rear rollers 52, 53 and two forward rollers 54, 55. The two rear rollers, 52, 53, are carried by unit 19 near the two upper rear corners, as best shown in Figs. 6 and 10, and they are partially sunk into recesses 56 formed in the unit (Fig. 6) so that only the upper surfaces of their peripheries are disposed above the body of the unit while it is being tilted (Fig. 7). Cover 42 likewise is provided with recesses 57 (Fig. 6) designed to clear rollers 52, 53 when the unit is closed, thus permitting the cover to seat firmly on gaskets 43. A pair of tracks 58, 58 in the form of metal strips are attached to the under side of cover 42, each in line with one of the rear rollers 52, 53, and said rollers bear against said tracks and press upwardly thereon, thus raising the cover when the unit is tilted forwardly and also during the return movement thereof.

Front rollers 54 and 55 are carried by cover 42, as shown most clearly in Fig. 3, and they project downwardly therefrom so as initially to engage the adjacent top surface of unit 19 to break the gasket seal, and then to roll along the upper side faces of gasket 39 to prevent that gasket from contacting the lower edge of the top 13 during the forward and backward movements of said unit. They normally extend into recesses 59 (Fig. 3) so that they clear the top of the unit, when closed, and thus permit the forward portion of the cover to bear down firmly on gaskets 43. As unit 19 is tilted forwardly, front rollers 54 and 55 initially ride out of the recesses 59 onto the top surface of the unit and momentarily lift the front portion of the cover. This occurs simultaneously with the lifting of the rear portion of the cover by rollers 52, 53. During continued movement of the unit 19, the cover is lifted by the rear rollers so as to clear the unit and is additionally supported by side flanges 14.

Cover 42 is not hinged but is held in its proper position laterally by housing top 13, and, in order to prevent undue friction between said cover and the housing top—which friction might otherwise cause the cover to bind and thus move up and down only with difficulty, or not at all—there has been attached to the four edges of the cover eight ball bearings 60 (see especially Fig. 2) which are adapted to roll in their sockets if and when they come into contact with the adjacent inside surfaces of housing top 13. By virtue of this provision, the cover will rise and fall freely notwithstanding contact with top 13. To facilitate installation and removal of the cover, a removable plate 13b comprises part of the top and is held in place by fastening means such as screws.

When unit 19 is in the open position, as shown in Fig. 7, the rear portions of the side edges of cover 42 rest on the side flanges 13a which are an integral part of housing top 13.

While there has been illustrated and described the preferred embodiment of the invention, it is to be understood that many modifications can be made without departing from the spirit thereof, and, accordingly, should not be limited except as clearly indicated by the language of the appended claims.

Having thus described the invention and its mode of operation, what is claimed as new and is desired to be secured as new and is claimed by Letters Patent of the United States, is:

1. In a refrigerator, the combination of a housing, a food storage member open at the top, means mounting the storage member in the housing for swinging movement of the storage member between a first position in which it lies within the housing and a second position in which it projects from the housing, a cover member for the storage member movably mounted in the housing so as to cover the storage member in its first position and to be retained in the housing so as to permit the storage member to go uncovered to its second position, and a roller carried by one of said members and projecting therefrom for riding on the other of said members during movement of the storage member between its first and second positions and spacing the members from one another during such movement, said other member having a recess receiving said roller in the first position of the unit so as to permit the cover member to have sealing contact with the storage member in its first position.

2. In a refrigerator, the combination of a housing, a unit having a food storage compartment open at the top, means mounting the unit in the housing for swinging movement of the unit between a first position in which the unit lies retracted within the housing and a second position in which the unit projects from the housing, a cover for the unit movably mounted in the housing so as to cover the unit in its first position and to be retained in the housing so as to permit the unit to go uncovered to its second position, and rollers carried by the unit and by the cover and projecting therefrom for riding on the cover and the unit, respectively, during movement of the unit between its first and second positions and spacing the cover and the unit from one another during such movement, the unit and the cover having recesses respectively receiving the roller of the cover and the roller of the unit in the first position of the unit so as to permit the cover member to have sealing contact with the storage member in its first position.

3. In a refrigerator, the combination of a housing, a food storage member open at the top, means mounting the storage member in the housing for swinging movement of the storage member between a first position in which it lies within the housing and a second position in which it projects from the housing, a cover member for the storage member movably mounted in the housing so as to cover the storage member in is first position and to be retained in the housing to permit the storage member to go uncovered to its second position, resilient means in the housing and acting upon the cover to urge it against the storage member, means substantially restraining movement of the cover with the storage member, and stop means in the housing to hold the cover when the storage member is in its said second position.

4. The combination as described in claim 3, and anti-friction guide means disposed between the movable cover and the housing for preventing binding of the cover in the housing as the cover moves in the housing.

5. The combination as described in claim 3, seal means disposed between the cover and storage members, and means for raising the cover off the seal means as the storage member moves from its first position to its second position.

6. The combination as described in claim 3, a second food storage member mounted in the first storage member, seal means disposed between the cover member and first-mentioned storage member, seal means disposed between the cover member and second storage member, and means for raising the cover off both said seal means as the first-mentioned storage member moves from its first position to its second position.

7. The combination as described in claim 3, a second food storage member mounted in the first storage member, a seal means disposed between the cover member and first-mentioned storage member, seal means disposed between the cover member and second storage member, and roller-and-track means for raising the cover off the first-mentioned seal means, spring means in the housing and urging the cover against the said first-mentioned storage member, roller means in the cover and adapted to ride on the seal means disposed between the cover member and second storage member, and resilient means urging the second storage member toward the cover to maintain contact between the last-mentioned roller means and the seal means on which it rides.

References Cited in the file of this patent

UNITED STATES PATENTS

| Number | Name | Date |
|---|---|---|
| 812,343 | Horner | Feb. 13, 1906 |
| 1,327,489 | Matthews | Jan. 6, 1920 |
| 2,490,535 | Minor | Dec. 6, 1949 |
| 2,573,272 | Petkwitz | Oct. 30, 1951 |